(12) United States Patent
Scarlett et al.

(10) Patent No.: US 6,666,279 B2
(45) Date of Patent: Dec. 23, 2003

(54) METHOD AND APPARATUS FOR CONTROLLING A TRACTOR/IMPLEMENT COMBINATION

(75) Inventors: Andrew James Scarlett, Bedfordshire (GB); John Charles Lowe, Bedford (GB)

(73) Assignee: New Holland North America, Inc., New Holland, PA (US)

(*) Notice: Subject to any disclaimer, the term of this patent is extended or adjusted under 35 U.S.C. 154(b) by 0 days.

(21) Appl. No.: 10/281,607

(22) Filed: Oct. 28, 2002

(65) Prior Publication Data

US 2003/0121674 A1 Jul. 3, 2003

(51) Int. Cl.$^7$ .......................... A01B 41/06; A01B 79/00
(52) U.S. Cl. .................................. 172/1; 172/2; 701/50
(58) Field of Search .............................. 172/1, 2, 3, 4, 172/4.5, 7, 8, 9; 701/50

(56) References Cited

U.S. PATENT DOCUMENTS 6,292,729 B2 * 9/2001 Falck et al. ................. 701/50

* cited by examiner

Primary Examiner—Christopher J. Novosad
(74) Attorney, Agent, or Firm—John William Stader; Collin A. Webb

(57) ABSTRACT

A method of controlling the combination of a tractor and an attached implement includes the calibration of a tractor/implement combination to allow for variations in prevailing slip-pull data at progressively increasing implement draft levels. The recorded data is then interpolated at a reference slip value and compared with a series of reference slip-pull curves. The slip-pull curve approximately most closely to the recorded pull value at the reference slip value is then selected for subsequent use in a control algorithm.

20 Claims, 4 Drawing Sheets

METHOD AND APPARATUS FOR CONTROLLING A TRACTOR/IMPLEMENT COMBINATION

BACKGROUND OF THE INVENTION

The present invention relates to a control system for controlling an implement attached to an agricultural tractor, and, particularly, to a control system that will allow for variations in prevailing slip-pull data at progressively increasing implement draft levels.

The term, "tractor", is meant to include any vehicle capable of propelling a ground or soil engaging implement for the purpose of processing the ground or soil, or objects (e.g. crops, forage, shellfish) lying on or in the ground or soil. Typically a tractor is a four wheel drive vehicle having a hitch for attachment of an implement behind the vehicle. It is also well known for tractors to push implements, such as furrow presses. The typical configuration of a tractor includes an operator cab mounted at the rear of the vehicle, and a forward-mounted engine and transmission system. However it is also known to provide a multi purpose vehicle, that may function as a tractor, having a forward mounted cab and underslung engine and transmission systems beneath a load carrying deck. Other forms of tractors include two wheeled, two wheel drive devices and tracked vehicles that may be coupled to pull or push implements. The instant invention relates to and embraces within its scope all such tractors.

Tractor/implement combinations are widely used in various processes in agriculture. One of the most common of these is plowing, in which a plow is towed behind a tractor. However, tractors may be used for a great variety of other operations such as spraying, furrow pressing, harrowing, raking, seeding and a number of specialized operations such as arise, for example, in vineyards and estuaries, in which specially designed ground-engaging implements are used. Consequently, "implement" as used herein includes but is not limited to plows, harrows, furrow presses, rakes, seed drills, and indeed virtually any article that may be attached to or operated by a tractor and that has the effect of increasing the energy demand of the tractor by virtue of engagement of the implement with the ground or soil or with objects thereon or therein.

Electronic control of the subsystems of tractors is becoming more and more common. For example European Patent Application No. 0838141 (the entire disclosure of which is incorporated herein by reference) discloses an integrated control system for tractors (designated by the trade mark "TICS" that is the subject of Community Trade Mark registration no. 1532696), by means of which a programmed microprocessor (or series of microprocessors) maximizes the work rate of a tractor, e.g. during plowing operations, by comparing the implement draft force against a steady state reference model, and performing implement working width and transmission ratio adjustments in order to maintain a maximal work rate while also maintaining a predetermined implement working depth.

There are four readily identifiable subsystems of a tractor/implement combination operating under the control of arrangement such as the aforementioned TICS. The subsystems influence the performance of the combination. They are the tractor engine; the tractor transmission; the implement; and the tire/soil interface. As disclosed in the aforementioned European Patent Application No. 0838141, it has in practice proved impossible successfully to carry out tractor/implement control using a dynamic reference model. The arrangement of the control system in European Patent Application No. 0838141 therefore includes a steady state reference model. In the use of such a model it is necessary for the control software to process accurately generated data on the influence of variables on the behavior and/or performance of the tractor/implement combination.

It is readily possible to obtain real-time data on the engine torque and governor setting, through use of sensors. One suitable form of engine torque sensor is disclosed, for example, in European Patent Application No. 0741286. It is also a straightforward matter to detect, using known transducers, the selected transmission ratio and generate a signal corresponding thereto for use by the control software. Prediction of the horizontally acting load resulting from engagement of the implement with the soil, or with other objects as noted above, is also possible. The method disclosed in European Patent Application No. 0838141 includes for this purpose an assessment of the prevailing soil strength value (or an equivalent thereto in the event of the implement engaging a medium other than soil) during calibration of apparatus included on the tractor/implement combination.

Heretofore, however, there has been no proposal for providing real-time information on the effect of the prevailing tire/soil interface on the performance of a tractor/implement combination. When a wheeled tractor propels an implement either by towing it or by pushing it, a degree of so-called "wheel slip" arises. Wheel slip, that is expressed as a percentage value, varies in dependence on numerous factors including the traction factors or conditions, that in turn depend on the soil type and density, the soil moisture conditions, and the presence at the soil surface of e.g. crop residues; and vehicle factors, including the tire size, the tire condition, the ballasting (weight distribution) of the tractor, and whether the tractor is a two wheel drive (2WD) or four wheel drive (4WD) vehicle.

The tire size and condition (that determine the area of the tire surface in contact with the soil) do not in practice vary during e.g. a plowing operation. Similarly the vehicle ballasting is, in Northern Europe at least, likely to be invariant during e.g. a plowing operation. This is because in Northern Europe the only factor that is likely to cause variations in the vehicle ballasting is the gradual depletion of fuel in the tanks of the tractor. This mass change is insignificant compared with the mass of the tractor. In North America it is known to inject nitrous ammonia during soil tilling operations. The nitrous ammonia is typically stored in a tank at the front of the tractor. Reduction of the level of nitrous ammonia during tilling may (depending on the mass of nitrous ammonia dispensed) have a noticeable effect on the ballasting of the tractor.

For a given tractor and implement combination it is possible to derive a so-called "slip-pull" curve that is a plot of the percentage wheel slip (y-axis) against the horizontally acting load resulting (referred to as the draft, in kN, when the tractor tows an implement) from engagement of the implement (x-axis). The term "slip-pull" is used even when the tractor is arranged to push rather than tow an implement.

In the past the possibility of variations in slip-pull characteristics have been largely ignored in the software responsible for predicting the performance of a tractor/implement combination. Instead it has been the practice simply to employ a one-dimensional lookup table, stored in a memory forming part of the control apparatus, that represents an idealized slip-pull curve of use of a tractor/implement combination in a "sandy loam stubble" (SLS) soil. This approach was generally acceptable for the following reasons:

(a) The SLS slip-pull curve is fairly conservative. Pull that can be generated at a given slip level (for the same tire size and vehicle mass) is dependent on inherent soil strength and the frictional nature of the surface. Hence while a sandy soil will return similar slip-pull characteristics over a wide range of moisture contents (until its bearing capacity is eventually reduced); a clay-based soil is inherently stronger and can therefore generate greater traction. However the range of moisture contents over which this can be achieved is narrower, increasing moisture causing a rapid increase in wheel slip. Consequently in the majority of field conditions in which plowing would be contemplated, the SLS curve returns an acceptable estimate (or possible underestimate) of the pull levels that can be generated at any given slip.

(b) Additionally a tire-soil traction system is a relatively stable, forgiving system at the slip levels which TICS tries to operate for maximum field efficiency (11–14% slip). At times (in dry, good traction conditions), the traction interface may have appeared under-loaded (8–10% slip), but this is often a result of a compromise between available engine power, implement-imposed draft and vehicle ballasting and tire size.

Despite the generally acceptability of the single SLS slip-pull curve as discussed, a need has arisen for greater robustness of the control. This need has arisen principally from use of tractor/implement combinations in soils that do not closely match the SLS soil on which the stored SLS slip-pull curve is based; and use of a mis-matched tractor and implement combination.

SUMMARY OF THE INVENTION

It is, therefore, an object of the present invention to provide a method of controlling an implement attached to a tractor that solves the aforementioned problems of prior art control systems.

It is a feature of this invention that the method of controlling a tractor/implement combination can be utilized with an implement that is not adjustable.

It is an advantage of this invention that the method of controlling the combination of a tractor and attached implement advantageously improves the robustness and accuracy of control of the tractor/implement combination.

It is another object of this invention to provide a method of controlling the combination of a tractor and attached implement that is suitable for use with a tractor/implement combination in which one or more features of the implement are adjustable so as to vary the horizontally acting loading (pull) experienced by the tractor.

It is another feature of this invention that the method includes selection of a transmission ratio that is known to be suitable for the tractor/implement combination and for the task under consideration.

It is still another feature of this invention that an experienced tractor operator will know that in carrying out some tasks only a limited range of the tractor transmission ratios is suitable, so that the method advantageously embraces within its scope selecting the transmission ratio selected from the group of suitable ratios for the task in question.

It is another advantage of this invention that the predetermined engine governor setting will be used as the setting corresponding to maximum speed of the tractor engine in the selected transmission ratio.

It is another advantage of this invention that the method of controlling the tractor/implement combination provides a convenient datum setting, although other governor settings may if desired be selected.

It is still another feature of this invention that the step of adjusting one or more settings of the implement, when carried out, includes increasing the working depth of a depth-adjustable implement.

It is still another advantage of this invention that the step of adjusting implement settings, when carried out repeatedly, sequentially increases the draft experienced at the tractor/implement hitch, thereby permitting the calibration method to be carried out over a range of loadings.

It is yet another feature of this invention that the step of adjusting one or more settings of the implement may include increasing the width of a width-adjustable implement.

It is yet another advantage of this invention that the step of increasing the width of a width adjustable implement, when carried out repeatedly, also sequentially increases the loading of the tractor.

It is still another feature of this invention to adjust the implement depth to a predetermined value before adjustment of the element width of the implement commences.

This preferred order of the method steps is advantageous because under some soil conditions and with some tractor/implement combinations, it is possible, through adjustment of the implement depth alone, to achieve a degree of wheel slip that exceeds the normal working range. Under such circumstances there is no need additionally to increase the width of the implement in order to provide a full range of test loadings for the tractor/implement combination. This is preferable because tractor operators generally prefer to maintain a constant furrow width when plowing a field.

Nonetheless, within the scope of the invention it is possible to permit further adjustment of the implement depth after commencement of the adjustment of the implement width. This possibility allows numerous options for increasing the tractor wheel slip to a predetermined threshold value.

Preferably the predetermined wheel slip threshold value is 28%. Once the horizontally acting load on the tractor is sufficient, through practicing of the method of the invention, to cause this degree of wheel slip the tractor is operating well outside its normal, efficient range. Currently therefore there is therefore no requirement to obtain further data after a 28% wheel slip value has been reached.

It is still another object of this invention to provide a method of controlling a tractor/implement combination that includes the step of comparing the stored values with reference data includes the sub steps of:

(a) determining from the stored values a reference value of the horizontally acting load corresponding to a predetermined reference wheel slip value; and (b) mapping the reference value of the horizontally acting load onto a series of reference data to enable selection of a set of the reference data.

More specifically the substep of determining the stored values includes the further substep of:

(c) determining the value of the horizontally acting load at the reference wheel slip value, by interpolation between two or more said values that are stored in a memory device.

It is yet another object of this invention to provide a method of controlling the combination of a tractor and attached implement that incorporates reference data including a plurality of characteristic wheel slip/horizontally acting load (slip-pull) curves; and the step of selecting a set of reference data includes the sub-step of:

(a) selecting a said curve by identifying the curve, from the plurality, that approximates most accurately to the reference value of the horizontally acting load at the reference wheel slip value.

These features advantageously allow for straightforward manipulation of the recorded data and their comparison with pre-existing slip-pull curves. The use of a plurality of slip-pull curves greatly increases the accuracy of the model, compared with the prior art arrangement that used only a single such curve.

In all probability the reference value of the horizontally acting load at the reference wheel slip value, that in a preferred embodiment is 25% wheel slip, does not lie exactly on one of the slip-pull curves. Therefore, it is a further object of this invention to provide a method of controlling a tractor/implement combination that includes the addition of positive and negative tolerances to respective values represented by the reference curves at the said reference wheel slip value. In other words, the method includes effectively "broadening" the curves at least at the reference wheel slip value, so that any given reference horizontally acting load value at the reference wheel slip value will intersect one of the curves.

To ensure robustness of this technique, the modulus of the positive tolerance added to each said reference value is greater than the modulus of the negative tolerance added thereto. For this reason it is also desirable that the sum of the modulus of the said positive tolerance added to a first said referenced curve and the modulus of the said negative tolerance added to the next successive reference curve along a line representing the said reference wheel slip value is equal to the distance along the said line by which the said first and second reference curves are separated one from another.

The foregoing features ensure that the "broadening" of the reference slip-pull curve is sufficient that any reference horizontally acting load value likely to be recorded during practicing of the method will intersect one of the curves.

It is yet another feature of this invention that the ratio of the modulus of the positive tolerance to the modulus of the negative tolerance is 3:2.

It is still another feature of this invention that the reference curves are stored as a two-dimensional lookup table in a memory.

It is a further feature of this invention that the method of controlling a tractor/implement combination can include the following optional steps:

(a) detecting whether, during step (i), the tractor engine speed is less than a predetermined minimum; and (b) detecting whether, during step (i), the tractor wheel slip exceeds a predetermined initial wheel slip maximum.

In either case it is possible, as a result of such detection, as necessary to initiate a further control action. For example it is possible for the method to include the transmission of a message to a cab-mounted display device, to the effect that an engine stall is imminent by virtue of the calibration run being attempted in too high a transmission ratio or for a similar reason; or a message indicating that the draft loading caused by the implement is causing too high a degree of wheel slip for the calibration meaningfully to be carried out.

According to a second aspect of the invention there is provided a method of controlling a tractor/implement combination including the steps of:

(a) carrying out a method as defined herein; and (b) carrying out a control action using the resulting selected set of reference data.

The control action may, for example, include operation of a software program of the kind described in European Patent Application No. 0838141, using the resulting, selected set of reference data as an input thereto.

These and other objects, features and advantages are accomplished according to the instant invention by providing a method of controlling the combination of a tractor and an attached implement includes the calibration of a tractor/implement combination to allow for variations in prevailing slip-pull data at progressively increasing implement draft levels. The recorded data is then interpolated at a reference slip value and compared with a series of reference slip-pull curves. The slip-pull curve approximately most closely to the recorded pull value at the reference slip value is then selected for subsequent use in a control algorithm.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENT

Figure 1:
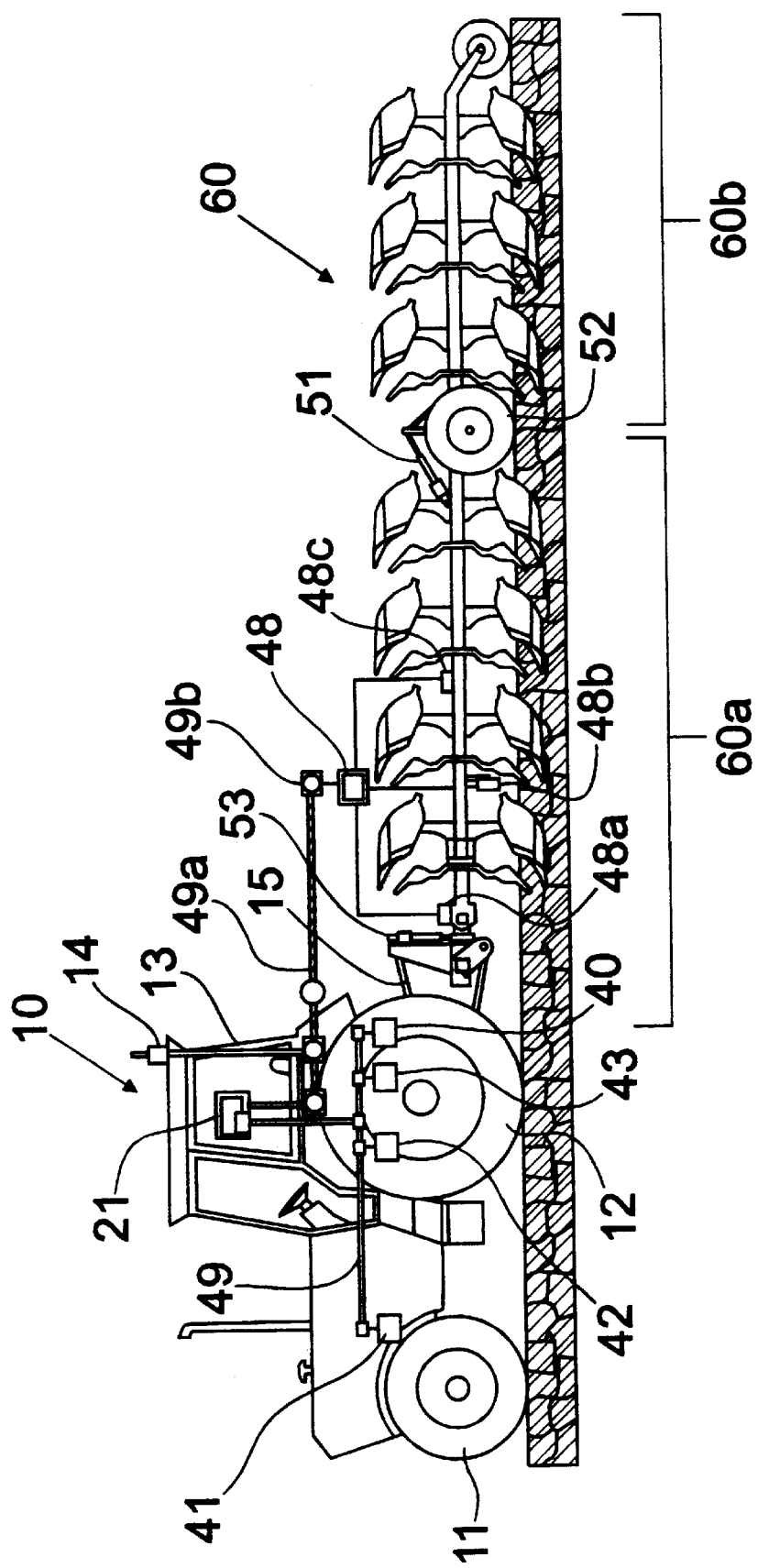
FIG. 1 is a schematic representation of a tractor/implement combination incorporating the principles of the instant invention.

Referring to the drawings, there is shown an agricultural tractor denoted by the reference numeral 10. In common with such vehicles in use nowadays, tractor 10 has a plurality of driven, ground engaging members in the form of front 11 and rear 12 pairs of driven wheels, although as noted herein other kinds of tractors, including those that do not include four driven wheels and/or a rear mounted operator cab, are within the scope of the invention. As an example of another kind of tractor there are known vehicles in which one or both the pairs of driven wheels are substituted by sets of caterpillar tracks. Such tractors are within the scope of the invention. Tractor 10 also has an engine (not shown in the drawings), a transmission system including a gearbox, transfer box and appropriate differentials for the driven wheels; an operator cab 13 and a three point hitch 15 at the rear of the vehicle between the rear wheels for attachment of an adjustable implement, which in the embodiment shown is a plow 60.

Thus the tractor/implement combination 10 may be regarded as comprising a plurality of controllable sub-systems, each of which influences the performance of the tractor in dependence on the prevailing conditions. The sub-systems include the engine (adjustable in one of two ways, i.e. by means of a throttle setting or by means of an engine governor setting, depending on the engine type); the transmission (adjustable by virtue of selection of gear ratios); the three point hitch 15; and the plow 60 adjustable in a manner described below by adjustment of one or more actuators.

The tractor/implement combination 10 includes a plurality of slave controllers for the sub-systems, in the form of microprocessors 40, 41, 42, 43 and 48. External hydraulics control subsystem 40 controls the flow of hydraulic fluid to actuators, located externally of the tractor, that draw hydraulic power from the on-board hydraulic circuit of the tractor.

Certain parameters of the engine performance are controlled by means of an engine management system including microprocessor 41 that optimizes engine performance in dependence on the throttle or engine governor settings input either by the tractor operator using suitable control members indicated schematically at 21, or from a programmable controller constituted as a further microprocessor also signified schematically by numeral 21 (described in greater detail in European Patent Application No. 0838141, the description of which is incorporated herein), located in the cab of the FIG. 1 vehicle. The engine management system operates by adjusting various parameters, such as the metering volume of a fuel injection system, the timing of the fuel injection system, the boost pressure of a turbocharger (if present), the opening of engine valves and the opening of portions of the vehicle exhaust system, via suitable powered actuators such as solenoids.

Tractor 10 includes a semi-automatic transmission system in which the transmission ratio selected is determined by a slave controller in the form of microprocessor 42 acting on one or more solenoids to engage and disengage gear sets of the gearbox and/or gears of the transfer box, in dependence on the settings of a plurality of gear levers in the operator's cab 13 or in dependence on signals from microprocessor 21.

The FIG. 1 embodiment includes hitch microprocessor 43 and plow control microprocessor 48. Microprocessor (slave controller) 43 controls the positions (i.e. the heights) of the elements of the implement (three point) hitch 15. Again, the microprocessor 43 controls a number of actuators such as solenoids in dependence on the settings of control levers etc in the operator's cab 13, on signals received from a further microprocessor 21, or, during carrying out of the method of the aforementioned European Patent Application No. 0838141 in dependence on its own programming.

Microprocessor 48 is in the embodiment shown in FIG. 1 operatively connected to actuators, e.g. respective hydraulic actuators, for adjusting the width of the plow; for inverting the plow at the end of each furrow; and for setting the plow working depth. Microprocessor 48 operates in dependence on signals received from microprocessor 21; from lever settings in cab 13; or according to its own programming. The plow adjustment actuators are known per se and are optional features of the tractor/implement combination.

FIG. 1 also shows optional sensors 48a, 48b and 48c (illustrated schematically) whose purpose is the detection of the condition of the various plow adjustment actuators. Sensor 48a detects the state of a plow turnover actuator and hence indicates the orientation of the plow. Sensors 48b and 48c respectively detect the working depth and working width of the plow 60.

The microprocessors preferably are interconnected via a vehicle CAN-BUS 49, an extension 49a of which connects microprocessor 48 (and sensors 48a–48c) via a node 49b. Cab 13 has mounted thereon an optional GPS position sensor 14 also connected to the CAN-BUS and hence to the microprocessors.

Plow 60 is in the exemplary embodiment shown a semi-mounted implement. The implement-mounted actuators are described in more detail below. By "semi-mounted" is meant an implement the working depth of the front part 60a of which is adjusted by adjusting the height of the tractor implement hitch; and the height of a second part 60b, to the rear of part 60a, by an actuator 51 on the implement itself. The use of a towed, semi-mounted implement is not essential for carrying out the method of the first aspect of the invention which, as noted above, is suitable for controlling tractor/implement combinations including a wide variety of implements that need not be towed behind the tractor.

As shown in FIG. 1, part way along its length plow 60 includes a mid-axle mounted wheel 52, relative to the location of which the rear portion 60b of plow 60 is pivotable. Actuator 51 operates under the control of microprocessor 40 to effect such pivoting of plow rear portion 60b, in dependence on a control algorithm.

Figure 2:
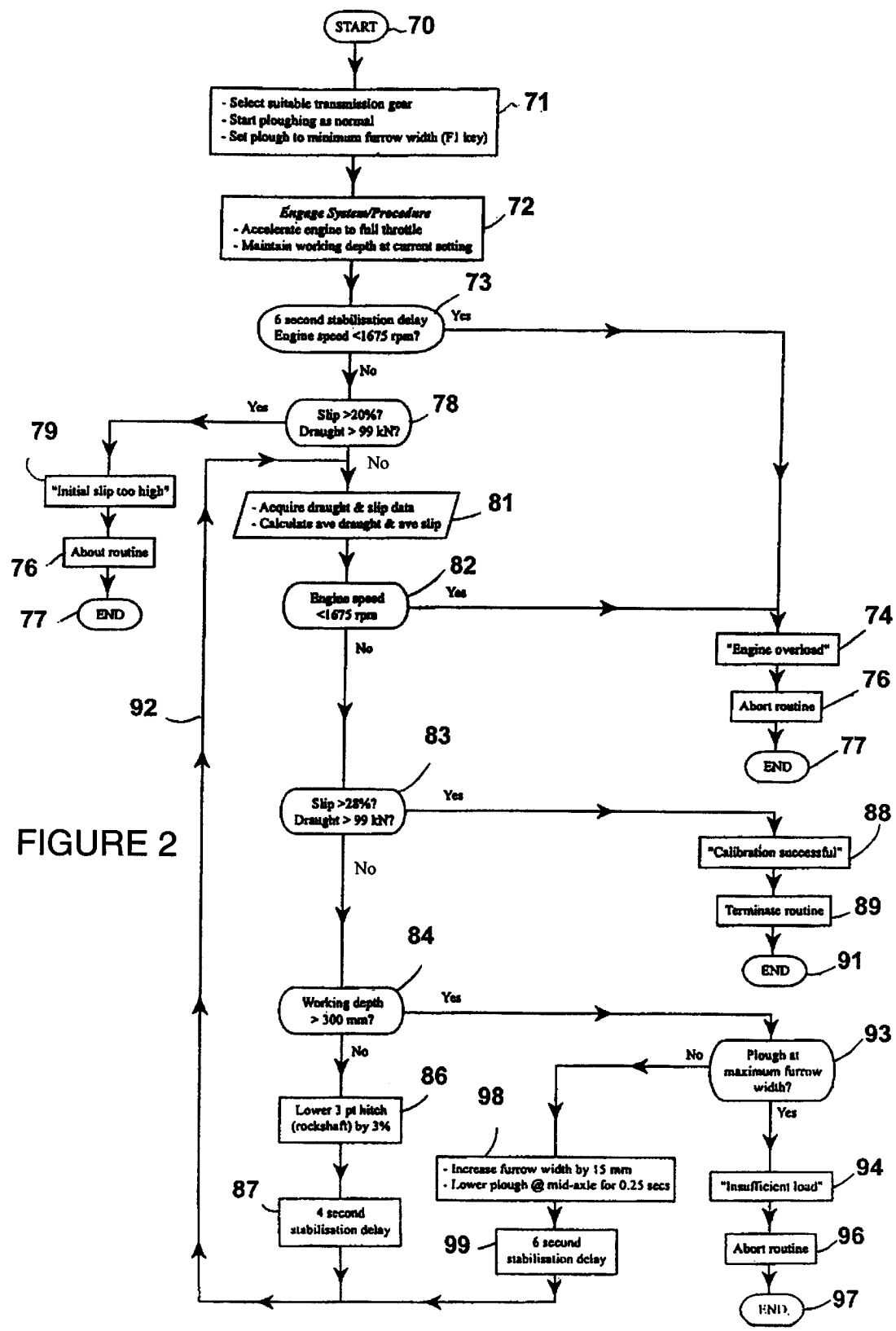
FIG. 2 is a flow chart showing the steps of a first aspect of the method of the invention.

FIG. 2 shows, in flow chart form, a method according to the invention of calibrating a tractor/implement combination according to prevailing slip-pull conditions. Following start of the procedure, as exemplified at block 70 that includes various software initializing subroutines, the tractor operator carries out the operations identified at block 71. These are the selection of a transmission gear that the operator knows is acceptable for the contemplated operation; the commencement of e.g. plowing and, assuming that the width of the implement carrying the selected task is adjustable, reducing the implement width as necessary to the minimum possible value.

Subsequently block 72 indicates two actions that are necessary, in the preferred form of the invention, for initializing the calibration routine proper. These are the acceleration of the engine to the full throttle setting; and the maintenance of the implement working depth (as necessary) at an initial setting. These and subsequent steps of the method of the invention occur automatically in the preferred embodiment. The steps subsequent to block 72 constitute the calibration routine of the method of the invention.

At the next block, 73, the software decides, following a stabilization delay that in the preferred embodiment is 6 seconds, whether there is a danger of the engine stalling. This is determined by an assessment of the measured engine speed. If this is less than a predetermined threshold value (1675 rpm in the preferred embodiment) the software routine aborts (blocks 74, 76 and 77).

Block 74 is an "engine overload" block that might, for example, send via the operator interface display 21 a message to the effect that the engine is about to stall. The engine overload and/or abort routine steps (74,76) could, in preferred embodiments, initiate subroutines that cause shifting of the transmission ratio and/or raising of the implement, as necessary, to avoid an engine stall condition.

Assuming that the tractor/implement combination and the soil conditions are such that there is no danger of an engine stall, the software next determines (block 78) whether the initial slip resulting from engagement of the implement with the soil at a high level is within acceptable limits. If either the slip exceeds 20% or the horizontally acting loading (draft force) measured at the link pin 48a exceeds a predetermined value (99 kN in the preferred embodiment) the routine terminates by implementation of the actions represented by blocks 79, 76 and 77. In other embodiments of the invention the draft force need not be measured at the link pin. It may be measured e.g. at a flywheel torque sensor as described above or at another location.

Block 79 is similar to block 74 in that it optionally generates an error message that is displayed via the device 21 and indicates that the initial slip experienced at the tractor wheels is at too high a value to enable the acquisition of meaningful data. This may be the result of the tractor operator attempting to pull too large an implement for the soil conditions engine torque, tire type and so on. If this is the case there are a limited number of remedial actions that the software can carry out. Nonetheless one of these might, for example, involve raising part or all of the plow by means of operation of the actuators 51, 53.

Assuming that the initial slip conditions are within acceptable limits, the tractor advances (block 81) across the field and acquires horizontally acting load (draft) and (wheel) slip data. From the acquired data the software calculates the average draft and average slip values. Following further checks (blocks 82 and 83) of the likelihood of a stall condition and of the slip and draft values exceeding predetermined threshold values, the software next assesses (block 84) whether the implement working depth is greater (higher) than a predetermined lower limit value.

The lower limit value corresponds to the lowest working depth of the implement. Assuming that there remains room for downward adjustment of the implement 60, at block 86 the software causes lowering of the forward end of the implement by, in the preferred embodiment, a 3% decrement. The lowering action may be achieved e.g. by means of operation of the actuator indicated at numeral 53; or by rotation of the three point hitch rock shaft as indicated in block 86, to lower the implement.

Following a further, short stabilization delay represented at block 87, the software routine then loops back to block 81 from which point the method repeats in order to provide for a further data acquisition run. If on the subsequent iteration the determination at block 83 indicates that the prevailing slip value exceeds (in the preferred embodiment) 28% and/or the measured draft force exceeds 99 kN the software terminates the calibration routine as indicated by blocks 88, 89 and 91.

Block 88 includes the optional transmission of a message to operator interface 21 indicating successful termination of the calibration. If on the other hand following one or more iterations of the loop represented by reference numeral 92 the determination at block 83 indicates that the slip and/or draft values are less than the preferred threshold values, the control routine passes again to block 84 at which there is an assessment of whether the implement working depth exceeds a predetermined lowermost value.

If the answer to this determination is affirmative, at block 93 the software determines whether the implement is at its maximum operating width (assuming the implement width to be adjustable). If it is not possible further to increase the implement width, as indicated at blocks 94, 96 and 97 the calibration routine terminates. Block 94 includes the transmission of a message via interface 21 to indicate that it is impossible using the tractor and implement combination selected to achieve the desired horizontally acting load to allow completion of the calibration routine.

If, on the other hand, there remains scope for increasing the implement width, as indicated at blocks 98 and 99 the width is increased and, optionally, the working depth of the implement is further incremented. Following a further stabilization delay represented at block 99, the software loops back to block 81 and the data acquisition step takes place once again. The software loops in the manner indicated, until (preferably) the data acquisition is complete.

For the avoidance of doubt, other implement adjustment régimes are possible. For example the implement need not be either width-adjustable or a semi-mounted plow as shown. Under such circumstances the method steps constituting Block 93 could be altered appropriately. In the specific embodiment of the semi-mounted plow shown, the described adjustment regime allows easily controlled, incremental changes in the implement draft force value.

Figure 4:
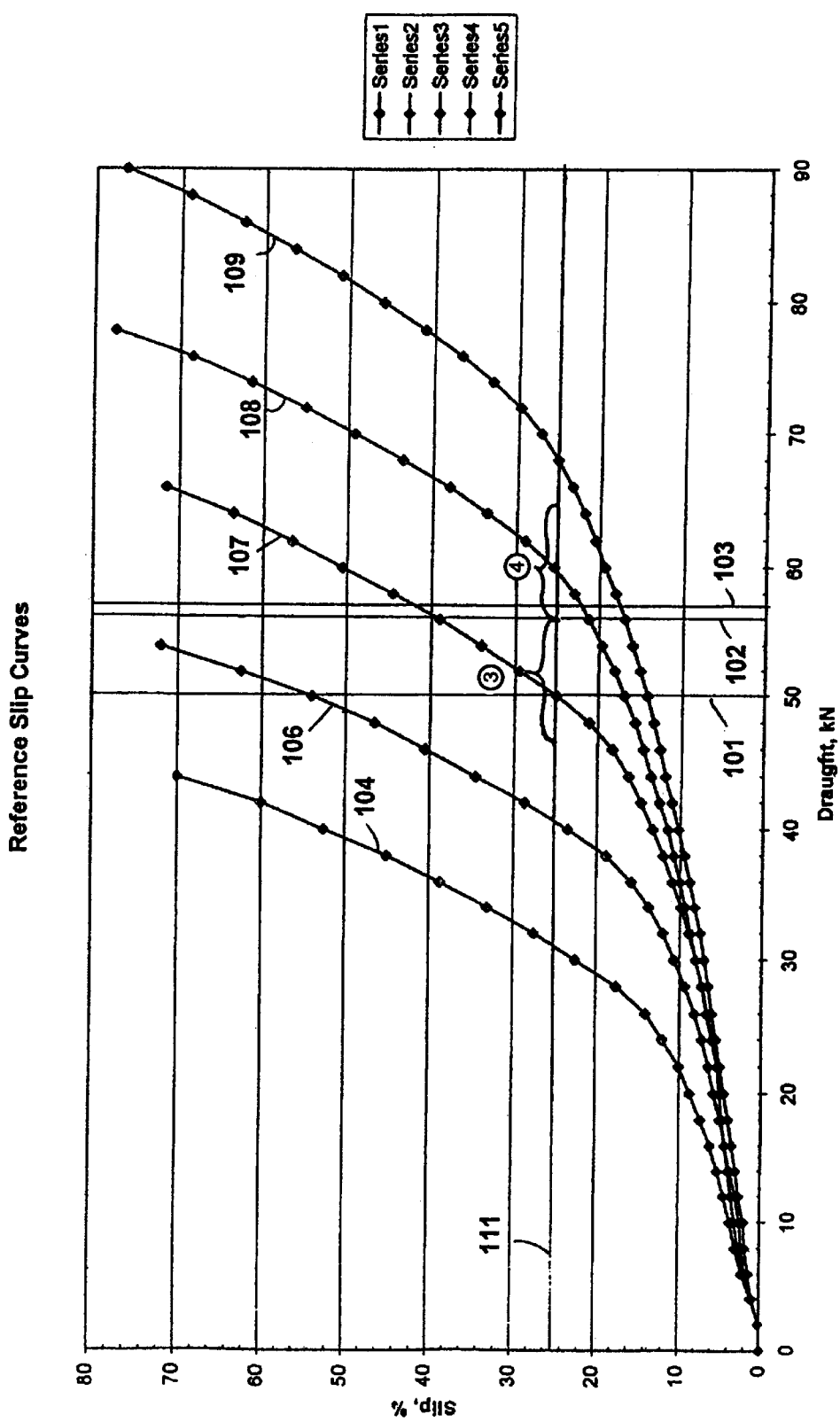
FIG. 4 is a graph depicting a technique, according to the invention, of selecting a reference slip-pull curve for use in a subsequently carried out control method.

As best indicated in FIG. 4, that shows lines 101, 102, 103 illustrating the intersection of three exemplary sets of acquired data with reference slip-pull curves, the calibration method includes for any given set of acquired data, an assessment of which of a plurality of reference slip-pull curves 104, 106, 107, 108, 109 is most closely applicable to the field conditions prevailing during the calibration routine. The assessment technique involves a determination of the recorded draft (horizontally acting load) value at a predetermined level, 111, of slip that in the preferred embodiment is for example 25%.

Figure 3:
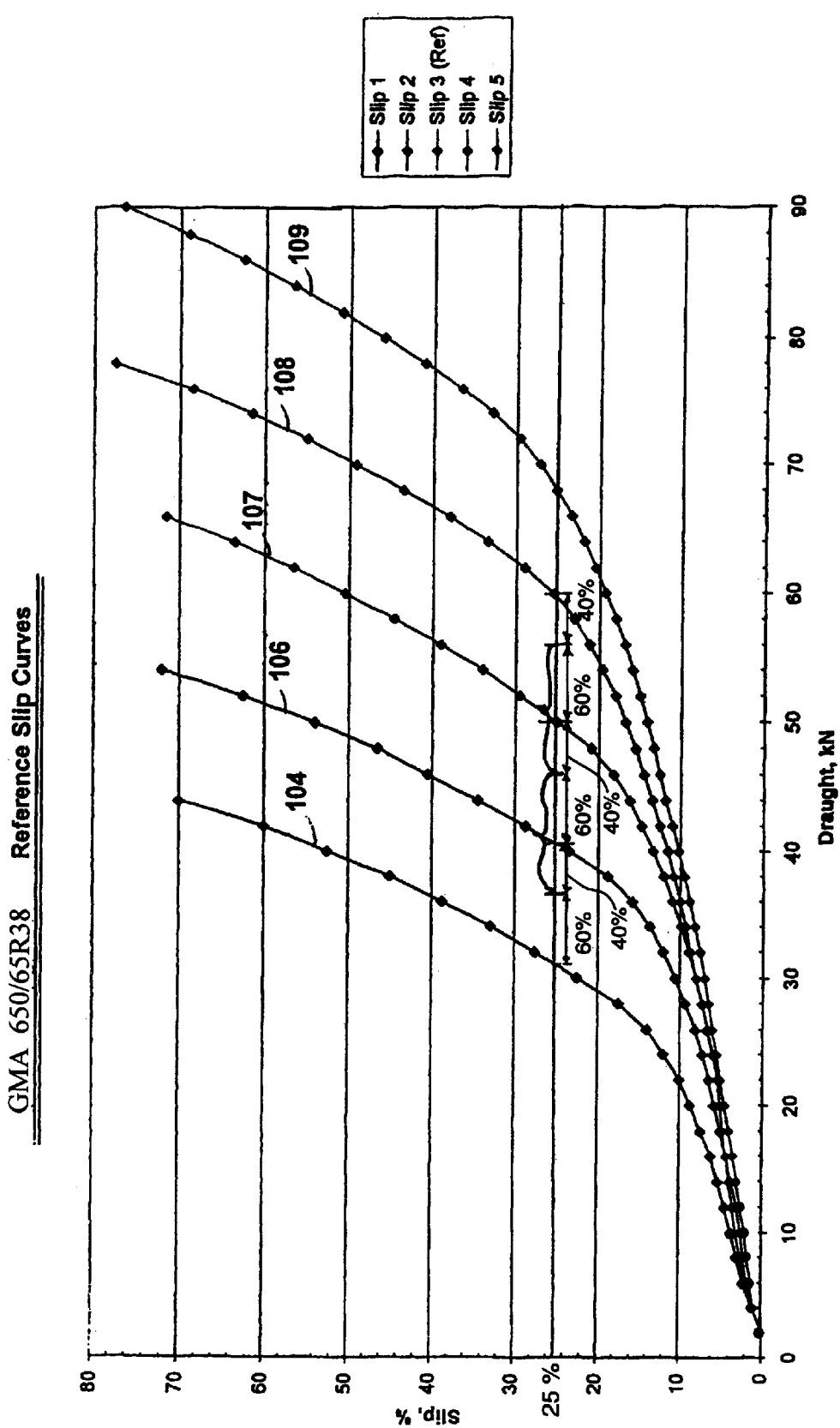
FIG. 3 is a graph illustrating a technique, according to the invention, for broadening stored reference slip-pull curves so as to ensure their intersection by recorded load values.

As signified in FIG. 4, the intersection lines (e.g. 101) of some of the sets of recorded data intersect one of the reference slip-pull curves (i.e. curve 107 in the example) at the 25% wheel slip value. However, the remaining sets of recorded data do not intersect any of the curves at the 25% slip-pull reference value. For this reason it is desirable in practice to broaden the slip-pull curves as exemplified in FIG. 3, so that each of the sets of recorded data definitely intersects one of the slip-pull curves at the preferred 25% wheel slip value level.

The broadening of the slip-pull curves is achieved by adding positive and negative tolerances to either side of the reference curves at the 25% wheel slip value. The positive tolerances added are in the preferred embodiment 50% greater than the negative tolerances, as indicated by the percentage values in FIG. 3. The effect of broadening the slip-pull curves at the 25% wheel slip value is to ensure that each line 101, 102, 103 etc. intersects one and only one of the reference curves at that slip value.

The chosen biasing of the positive and negative tolerances is to a degree a matter of design choice. The embodiment shown is likely to allocate each set of recorded data to a slip-pull curve having a lower, rather than a higher, average draft characteristic. The slip-pull curves themselves may be generated in any of several ways.

In the preferred embodiment curve 107 constitutes actual, recorded slip-pull data corresponding to a sandy clay loam stubble soil at a known moisture content, etc. The remaining curves 104, 106, 108 and 109 are factored versions of curve 107, such that over the range of slip values the curve gradients are similar but the overall draft values are higher or lower, as appropriate. Depending on which of the "broadened" slip-pull curves the recorded set of data intersects at the 25% (or other value) slip, the selected curve is then employed as a reference value for example in a control operation such as the operation of a TICS-type software control program. For the avoidance of doubt, the number of reference slip-pull curves may be varied within the scope of the invention. Also it is not necessarily the case that the said curves are simply factored versions of the same expression as represented by curve 107. For example each of the reference curves may represent recorded rather than simulated data.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A method of calibrating the control of a combination of a tractor and an attached ground-engaging implement comprising the steps of:

while the tractor and implement advance across a surface of the ground with a transmission ratio and a predetermined engine governor setting selected, and with the tractor experiencing one of a range of horizontally acting loads as a result of engagement of the implement with the surface of the ground, detecting the horizontally acting loading and a tractor wheel slip parameter, and generating signals indicative thereof;

storing in a memory the values of the said generated signals associated with a first setting of the implement;

comparing said stored values with reference data; and in response to said step of comparing said stored values, selecting for use in a control operation a set of reference data corresponding to the detected wheel slip parameter of the tractor and implement combination.

2. The method of claim 1 wherein the transmission ratio selected is known to be suitable for the tractor and implement combination and for the task under consideration.

3. The method according to claim 2 wherein the predetermined engine governor setting is the setting corresponding to a maximum speed of the tractor engine in the selected transmission ratio.

4. A method of calibrating the control of a combination of a tractor and an attached ground-engaging implement that is adjustable to vary the horizontally acting loading experienced by the tractor, comprising the steps of:

while the tractor and implement combination advances across a surface of the ground with a transmission ratio and a predetermined engine governor setting selected, and with one or more adjustable settings of the implement adjusted to a first setting so as to cause a minimal, horizontally acting loading as a result of engagement of the implement with the ground, detecting the said horizontally acting loading and a tractor wheel slip parameter, and generating signals indicative thereof;

storing in a memory the values of the said detected signals associated with said first setting of the implement;

adjusting one or more settings of the implement to a subsequent setting so as to increase the horizontally acting loading;

while the tractor and implement combination advances across a surface with said transmission ratio and said predetermined engine governor settings selected, and with the implement adjusted to the said subsequent setting, further detecting the resulting, increased horizontally acting loading and the corresponding said tractor wheel slip parameter, and generating subsequent signals indicative thereof;

further storing in said memory the values of the subsequent signals associated with said further setting of the implement;

repeating said adjusting, further detecting, and further storing steps as necessary until the detected tractor wheel slip parameter exceeds a predetermined threshold value;

then, finally comparing said last stored values of the subsequent signals with reference data; and as a result of step of finally comparing said last stored values, selecting for use in a control operation a set of reference data corresponding to the then current wheel slip parameter of the tractor and implement combination.

5. The method of claim 4 wherein the transmission ratio selected is known to be suitable for the tractor and implement combination and for the task under consideration.

6. The method of claim 4 wherein the predetermined engine governor setting is the setting corresponding to a maximum speed of the tractor engine in the selected transmission ratio.

7. The method of claim 6 wherein the step of adjusting one or more settings of the implement to a subsequent setting includes, when the implement is a depth-adjustable implement, increasing the working depth of the implement.

8. The method of claim 6 wherein the step of adjusting one or more settings of the implement to a subsequent setting includes, when the implement is a width adjustable implement, increasing the width of the implement.

9. The method of claim 8 wherein the step of adjusting one or more settings of the implement to a subsequent setting includes, when the implement is adjustable with respect to both width and depth, increasing the adjustment of the implement depth to a predetermined value before commencing adjustment of the implement width.

10. The method of claim 9 wherein additional adjustments of the implement depth may be made after commencement of the adjustment of the implement width.

11. The method of claim 4 wherein the step finally comparing said last stored values of the subsequent signals with reference data includes the steps of:

determining from said last stored values a reference value of the horizontally acting load corresponding to a predetermined reference wheel slip value; and mapping the said reference value of the horizontally acting load onto a series of reference data to enable selection of a set of the reference data.

12. The method of claim 11 wherein said determining step includes the step of:

determining the value of the horizontally acting load at the reference wheel slip value, by interpolation between two or more said values that are stored in a memory device.

13. The method of claim 12 wherein the reference data are a plurality of characteristic wheel slip/horizontally acting load curves; and wherein the step of selecting a set of reference data includes the step of:

selecting one of said curves by identifying the curve, from the plurality of curves, that approximates most accurately to the reference value of the horizontally acting load at the reference wheel slip value.

14. The method of claim 13 wherein the step of selecting one of said curves further includes the step of:

adding positive and negative tolerances to respective values represented by the reference curves at the said reference wheel slip value.

15. The method of claim 14 wherein the modulus of the positive tolerance added to each said reference value is greater than the modulus of the negative tolerance added thereto.

16. The method of claim 15 wherein the sum of the modulus of the said positive tolerance added to a first said referenced curve and the modulus of the said negative tolerance added to the next successive reference curve along a line representing the said reference wheel slip value is equal to the distance along the said line by which the said first and second reference curves are separated one from another.

17. The method of claim 16 wherein the ratio of the modulus of the positive tolerance to the modulus of the negative tolerance is 3:2.

18. The method of claim 17 wherein said reference curves are stored as a two dimensional lookup table in a memory.

19. The method of claim 18 wherein said detecting step includes the step of detecting whether the tractor engine speed is less than a predetermined minimum.

20. The method of claim 19 wherein said detecting step further includes the step of detecting whether the tractor wheel slip exceeds a predetermined initial wheel slip maximum.

* * * * *